(12) United States Patent
Zhang et al.

(10) Patent No.: US 8,559,727 B1
(45) Date of Patent: Oct. 15, 2013

(54) TEMPORAL COHERENCE IN CLEAR PATH DETECTION

(75) Inventors: Wende Zhang, Troy, MI (US); Jinsong Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 30 days.

(21) Appl. No.: 13/441,983

(22) Filed: Apr. 9, 2012

(51) Int. Cl.
*G06K 9/46* (2006.01)

(52) U.S. Cl.
USPC .......................................... 382/195; 382/103

(58) Field of Classification Search
USPC ................. 382/100, 104, 195, 217–221, 228; 700/223
See application file for complete search history.

(56) References Cited

U.S. PATENT DOCUMENTS

| | | | | |
|---|---|---|---|---|
| 7,376,262 | B2 * | 5/2008 | Hu et al. | 382/154 |
| 7,440,585 | B2 * | 10/2008 | Roh et al. | 382/103 |
| 2006/0213714 | A1 * | 9/2006 | Igawa | 180/274 |
| 2010/0017060 | A1 * | 1/2010 | Zhang et al. | 701/41 |
| 2010/0097455 | A1 * | 4/2010 | Zhang et al. | 348/119 |
| 2010/0097457 | A1 * | 4/2010 | Zhang et al. | 348/119 |
| 2010/0097458 | A1 * | 4/2010 | Zhang et al. | 348/119 |

\* cited by examiner

*Primary Examiner* — Samir Ahmed

(57) ABSTRACT

A method of detecting a clear path of travel. Input images are captured at various time step frames. Clear path probability maps of a current and previous time step frames are generated. A corresponding clear path probability map is generated for the current time step frame derived as a function of the clear path probability map of the previous time step frame and of a corresponding mapping that coherently links the previous time step frame to the current time step frame. A weight-matching map is generated. The probability values of the current time step frame are updated as a function of the corresponding probability map. A current frame probability decision map is generated based on updated probability values of the current time step frame. The clear path in the image of the current time step is identified based on the current frame probability decision map.

19 Claims, 3 Drawing Sheets

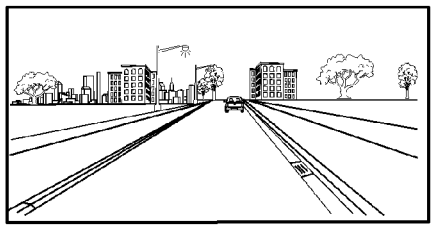
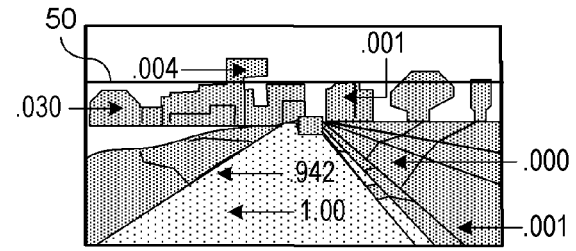
Fig. 2a  Fig. 2b
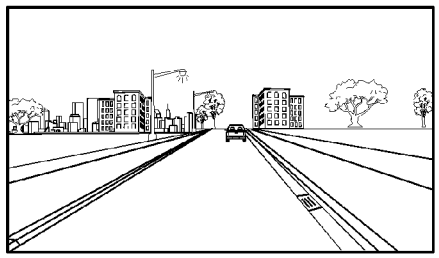
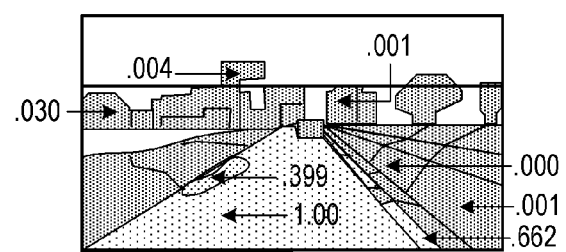
Fig. 3a  Fig. 3b
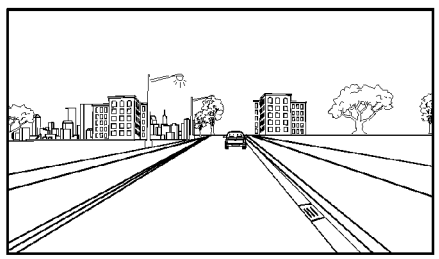
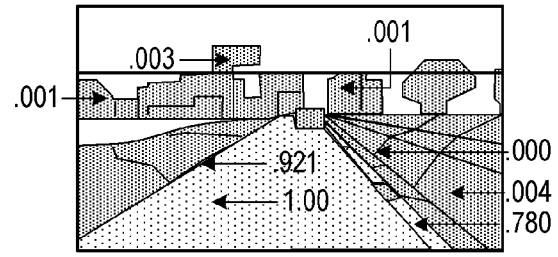
Fig. 4a  Fig. 4b
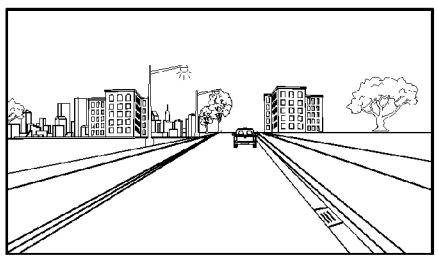
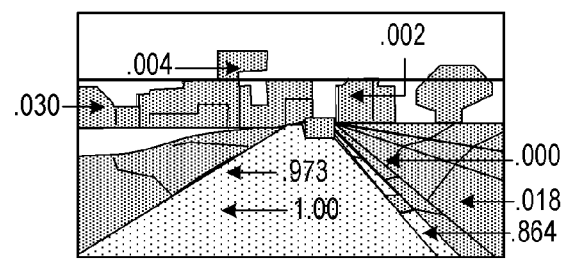
Fig. 5a  Fig. 5b

TEMPORAL COHERENCE IN CLEAR PATH DETECTION

BACKGROUND OF INVENTION

An embodiment relates generally to object detection in a path of travel of a vehicle.

Vision-imaging systems are used in vehicles for enhancing applications within the vehicle such as autonomous driving system or semi-autonomous driving systems. Such systems may be used to autonomously or semi-autonomously control the vehicle through steering systems, throttle control, braking control, or even utilized for lane departure warning systems.

Clear path detection systems identify a clear path in which to operate a vehicle traveling along a road. The path of travel is sensed for objects, including all non-road surfaces, so that the vehicle may travel along an uninterrupted path of travel. Features within an image may be detected and analyzed according to their form and relationship to the roadway. However, such methods may be slow due to intense data processing or the inability to distinguish clear path features and non-clear path features.

SUMMARY OF INVENTION

An embodiment contemplates a method of detecting a clear path of travel. Various input images of a scene exterior of the vehicle are captured utilizing at least one image capture device. The various input images are captured at various time step frames. A clear path probability map of a current time step frame is generated by a processing module. The clear path probability map identifies probability values that represent whether extracted features within the current time step frame are clear path features. A clear path probability map of a temporal previous time step frame is generated by the processing module. The clear path probability map identifies probability values that represent whether extracted features within the previous time step frame are clear path features. A corresponding clear path probability map is generated for the current time step frame. The corresponding clear path probability map is derived as a function of the clear path probability map of the previous time step frame and a corresponding mapping that coherently links the previous time step frame to the current time step frame. A weight-matching map is generated by the processing module. The weight-matching map includes weight values that identify a degree of successfully matching extracted features between the previous time step frame and the current time step frame. The probability values of the current time step frame are updated as a function of the corresponding probability map. The weight values are applied to the probability values of the corresponding probability map for determining the degree as to which the probability values of the corresponding probability map are used in updating the clear path probability map of a current time step frame. A current frame probability decision map is generated based on updated probability values of the current time step frame. The clear path in the image of the current time stamp is updated based on the current frame probability decision map.

BRIEF DESCRIPTION OF DRAWINGS

FIGS. 2a, 3a, 4a, 5a illustrate exemplary images captured by an image capture device at various instances of time.

FIGS. 2b, 3b, 4b, 5b illustrate exemplary clear path probability maps at the respective instances of time.

DETAILED DESCRIPTION

Figure 1:
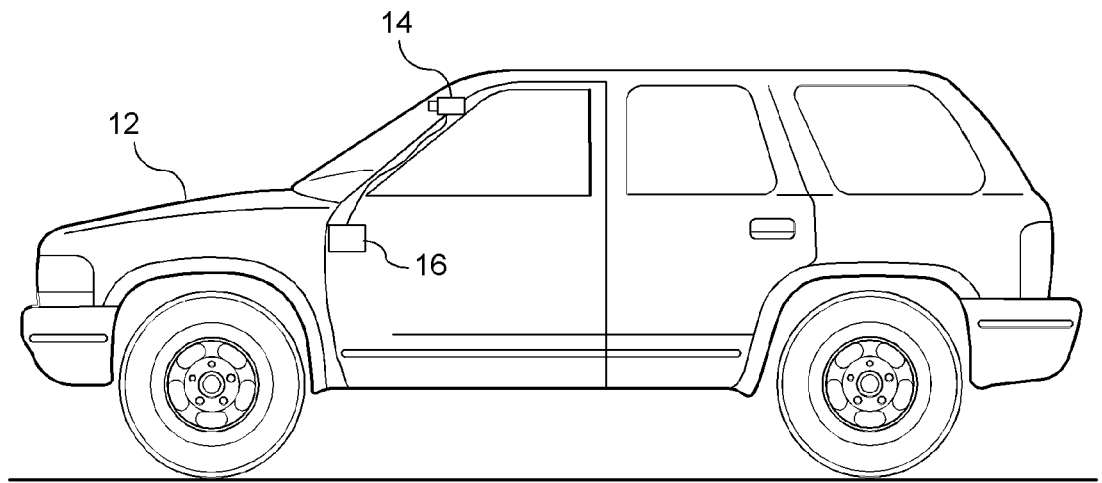
FIG. 1 is a vehicle integrating a clear path detection system.

There is shown in FIG. 1 a vehicle 12 integrating a clear path detection system. The clear path detection system includes an image capture device 14 mounted to the vehicle 12. The image capture device 14 is in communication with a processing unit 16.

The image capture device 14 may include a camera or other imaging device that captures images of the road of travel. The image capture device 14 captures images forward of the vehicle that are used to identify a clear path of travel. Preferably, the image capture device 14 is configured for performing continuous image capture. The images captured by the image capture device 14 may be stored in a memory of the image capture device 14, transferred to an off-board memory device, or may be transferred to the processing unit 16 for analysis. Moreover, more than one capture image device may be used in order to capture images rearward and/or on both sides of the vehicle for clear path detection. With a surrounding view system, four wide field-of-view (180 degree +) cameras and a forward looking narrow field-of-view (~50 degrees) camera perform clear path detection. Images captured rearward of the vehicle may be used in the analysis for identifying the clear path of the road of travel forward of the vehicle.

The captured images are preferably a two-dimensional image of know pixel dimensions. The image contains a plurality of identifiable pixels. Each of the pixels includes a set of bits that correspond to a color on a predetermined color map that represents a color intensity value.

The processing unit 16 as illustrated in FIG. 1 is a single unit; however, it should be understood that functions of the processing unit 16 may be performed by one or more devices implemented in software, hardware, and/or application-specific integrated circuitry. The processing unit 16, may be a general purpose processor, digital computer including a central microprocessor or central processing unit, ASIC, or other processing module having non-volatile memory, read only memory, programmable read only memory, RAM, A-to-D circuitry, D-to-A circuitry, input/output circuitry, buffering capability and appropriate signal conditioning such as digital signal processing. The processing unit 16 is devised to execute algorithms utilizing inputs from the devices described herein as well as other devices or systems within the vehicle.

The processing unit 16 determines a clear path in the captured image. The clear path is utilized in guiding the vehicle along the road of travel. The processing unit 16 may perform the guidance functions as described above or may transfer the results to a secondary application that performs the guidance functions.

Images captured by the image capture device are illustrated in FIGS. 2a-5a. The images are captured at different time steps. FIGS. 2b-5b illustrate associated probability maps of the respective captured images in FIGS. 2a-5a that illustrate probabilities for identifying the clear path in each captured image. A probability map is generated for identifying a clear path of the road of travel for each image as it is captured. Various techniques may be utilized for determining a probability associated with each of the features within the current time step frame. One such technique is described in co-pending application having a Ser. No. 12/581,742 filed on Oct. 19, 2009 which is incorporated by reference in its entirety. The technique described herein segments the input image into a plurality of patches and determines probability values for each of the patches.

As shown in FIGS. 2b-5b, probability values illustrate the likeliness of a patch that the respective feature of the patch is classified as part of the clear path. The probability values range from 0-1. Probability values greater than 0.5 are indicative that the respective feature of a patch is classified as part of the clear path whereas probability values less than 0.5 are indicative that the respective feature of a patch is classified as not part of the clear path. The closer that the probability value is to 1, the greater the confidence that the corresponding patch is part of the clear path. The closer that the probability value is to 0, the greater the confidence that the respective patch is not part of the clear path.

In the embodiments described herein, a technique is applied that generates a decision map that includes updated probabilities of the clear path for increasing the confidence level of the identified clear path in the current time step frame. The technique includes segmenting a current time step frame into a block-grid. A corresponding block-grid of the previous time step frame are identified based on the block-grid of the current time step frame. A correspondence mapping is generated between the respective block-grids. Feature extraction is also applied to the corresponding block-grid of each respective time step frame for determining a degree (or weight) as to whether identified corresponding block-grids match one another. Once the corresponding mapping is generated and a degree (or weight) is determined with respect to how closely each of the associated block-grids match, a temporal coherence technique is performed between the previous time step frame and the current time step frame for generating a probability decision map for identifying the clear path of the traveled road. The following paragraphs describe in detail the process for generating the probability decision map utilizing the temporal coherence technique between a current time step frame and a previous time step frame.

Figure 6:
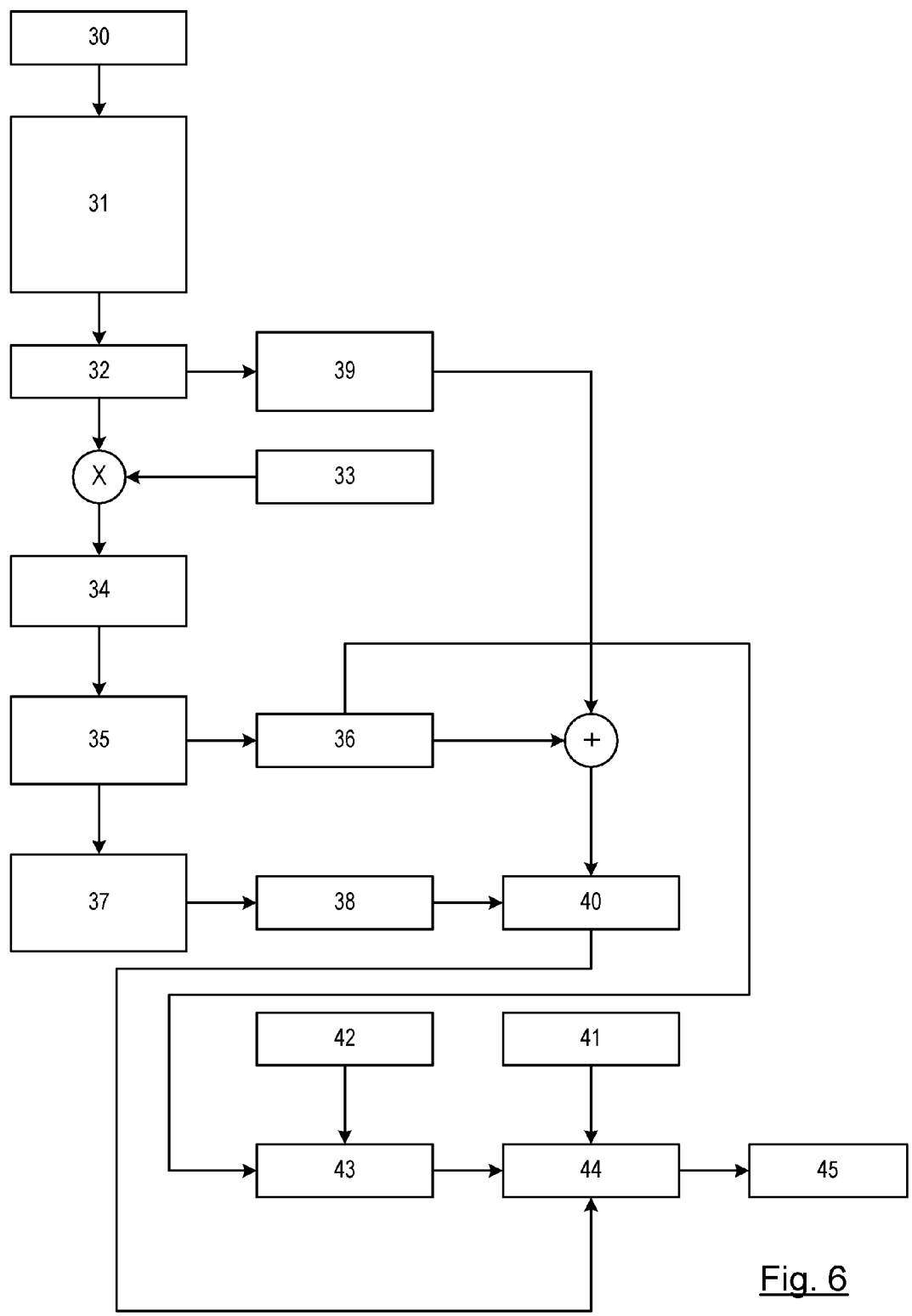
FIG. 6 is a flowchart of a method for temporal coherence of the clear path.

FIG. 6 illustrates a flowchart of a technique for identifying the clear path using the temporal coherence technique.

In step 30, images are captured by the image capture device. The images preferably capture the environment exterior of the vehicle including a path of travel of the vehicle. The captured images are preferably a two-dimensional image of known pixel dimensions (color or grayscale). The image contains a plurality of identifiable pixels. Each of the pixels includes a set of bits that correspond to a color on a predetermined color map that represents a color intensity value.

Each of the images is time displaced from one another. That is, the images are obtained in temporal proximity to one another for comparing a current time step frame with a previous time step frame.

In step 31, a region of interest is identified in each captured image. A region of interest is selected within the image for focusing on an area of the image that is more likely to contain a clear path of travel. By filtering out portions of the image where the clear path of travel is most likely not to exist, processing time for detecting a clear path of travel is reduced.

A skyline is preferably selected as the region of interest as the sky is the best indicator for separating the ground plane, which contains the clear path, from the sky. The region of interest may be generated based on a vanishing point and a horizon line which targets a specific region of the image for performing clear path detection as opposed to analyzing the entire image. An upper boundary of the region of interest (a horizon line with a safety margin) is illustrated generally by 50 in FIG. 2b.

The term "vanishing point" as used herein is a broad term, and is given its ordinary and customary meaning to one ordinarily skilled in the art, and refers to an infinite far point on the horizon that is intersected by multiple parallel lines on the ground. Identifying a road surface that includes a clear path on which to drive is most necessarily below the vanishing point or horizon line. Filtering the image so that only the area below the horizon line is analyzed assists in clarifying which pixels should be analyzed for identifying a road surface from irrelevant pixels. As one skilled in the art appreciates, there are many known methods for determining a vanishing point and corresponding horizon line. The embodiments herein are not restricted to any one particular technique and any respective technique may be utilized herein without deviating from the scope of the invention.

In step 32, the region of interest is segregated into a block grid. The block-grid is comprised of blocks (small rectangles or squares). Each of the blocks contains a defined area within the region of interest. The blocks in the block-grid of a current time step frame are compared with the blocks in the block-grid of previous time step frame.

In step 33, the motion of the vehicle is tracked. The motion of the vehicle is utilized in combination with the block-grid of the current step frame for generating a corresponding mapping in a previous time step frame.

In step 34, correspondence mapping for the previous frame is derived from the block-grid of the current frame (step 32) and vehicle motion (step 33). Correspondence mapping is generated by assuming that all points within the region of interest are on the flat ground plane. Therefore, any given point in the flat ground plane can be mapped to previous time step if all conditions are ideal (i.e., all points being mapped are on the flat ground and are stationary). For each respective block within the block-grid, coherence is found in a previous time step frame. That is, the location of a block is identified in the current time step frame and a corresponding location is identified in the previous time step frame. The rectangular shape of a respective block in the current time step will be trapezoid-shaped in the previous time step frame due to vehicle motion (in which the respective block in the previous time step frame is a greater distance in the image in contrast to the current time step frame).

In step 35, a determination is made as to whether the blocks mapped in the previous time step frame are within the current region of interest. If a block is projected to be out of the region of interest, then the block is removed from the mapping. If a block is projected to be in the region of interest, then the block is assigned an index. Feature extraction is also applied to each block within the block-grid for extracting features from the designated region.

In step 36, a block-grid index is assigned to each respective block that is determined to be within the region of interest of the previous time step frame. The respective block in a previous block-grid frame is identified so that it can be recalled and compared to a respective block of the current time step frame.

In step 37, an effective block-grid is identified for extracting features from the respective block-grid of the previous time step frame.

In step 38, features are extracted from the effective block-grid identified in step 37. Feature extraction involves identifying features within each block of the block-grid based on appearances.

In step 39, features are also extracted from each block of the block-grid from the current time step frame.

In step 40, a block from the current time step is compared to a block from the previous time step based on the block-grid index. Block matching involves analyzing the features of the corresponding blocks of the current time step frame and the previous time step frame. Matching is performed without any occlusions and is based on appearance. If an appearance match is present between a block of the current time step frame and a block of the previous time step frame, then the probability decision map, as will be described later, will be updated based on both the probabilities of the previous and current time step frame, and on a time decay factor. Alternatively, if there is not much commonality between the respective blocks of the previous and current time step, then the probability decision map will be based primarily on the current time step frame. The utilization of the probabilities from the previous time step frame in determining probability decision map is dependent on a degree of appearance matching properties and the time decay factor as the weights for the probability combination between the current time step frame and the previous time step frames. This approach is described in the following equation:

$$p^{TS}(u_0, v_0) = \frac{c_0 \cdot P_0(u_0, v_0) + \sum_{t=1}^{n} c_t \cdot m_t(u_0, v_0 \mid u_t, v_t) \cdot P_t(u_t, v_t)}{c_0 + \sum_{t=1}^{n} c_t \cdot m_t(u_0, v_0 \mid u_t, v_t)}.$$

A block location $(u_t, v_t)$ in the previous $t^{th}$ time step frame which corresponds to block location $(u_0, v_0)$ in the current time step frame is identified based on vehicle motion and on-ground assumption. A matching function $m_t(u_0, v_0 \mid u_t, v_t)$ indicates the weight or degree of each block $(u_t, v_t)$ in the previous $t^{th}$ time step frame contributing to the temporal probability update, which is based on its feature similarity $S(f_t(u_t, v_t), f_0(u_0, v_0))$ to corresponding block $(u_0, v_0)$ in the current time step frame. The embodiments herein are not restricted to any one particular similarity measure or matching function. Any respective matching and similarity measure approach may be utilized herein without deviating from the scope of the invention. The decay factor $c_t = \lambda^t$, $t = 0, 1, \ldots, n$, $0 < \lambda \le 1$ indicates the contribution factor of each frame to have the smoothed probability $p^{TS}(u_0, v_0)$. $\lambda = 1$ means equal contribution from each frame's probability $P_t(u_t, v_t)$, while $\lambda < 1$ means the previous time step frame contributes less when it is from an earlier time.

In step 41, a probability map is generated for identifying a clear path of the road of travel in the current time step frame. As described earlier various techniques may be utilized for determining a probability associated with each of the patches' features within the current time step frame such as the technique described in co-pending application Ser. No. 12/581,742.

In step 42, a probability map is generated for identifying a clear path of the road of travel in a previous time step frame. The probability map displays the probabilities of various patches within the previous time step frame related to both the clear path and the non-clear path. Probability maps of previous time steps are illustrated in FIGS. 2b-5b.

In step 43, corresponding mapping, as identified by the block-grid index (in step 36), is applied to the probability map of the previous time step frame for generating an estimated current probability map. That is, the correspondence mapping assists in identifying how points move from the previous time step frame to the current time step frame.

In step 44, the outputs from step 41 and 43 are cooperatively factored for updating the probability map of the current time step frame with the weights generated in step 40. An estimated probability based on probability map of the previous time step frame and corresponding weight mapping are combined with the probability map of the current time step frame for generating an updated probability map for the current time step. The degree as to which the probability map derived from the previous time step frame is relied on is based on the weight matching and time decay factor. As described earlier in step 40, the greater the match between the current time step frame and the previous time step frame, the greater degree that the probability map of the previous time step frame is used in generating the probability update. As a result, a weighting factor may be generated based on the degree of similarity determined in step 40 as well as the decay factor, and applied to the probability map generated by the previous time step frame for determining its use in generating the probability update.

If the respective blocks features are similar, then probability map determined in step 43 and the probability map determined in step 41 are both utilized to generate the probability update. If the respective block features are dissimilar, the update probability mapping relies more on the probability map determined in step 41.

Figure 7:
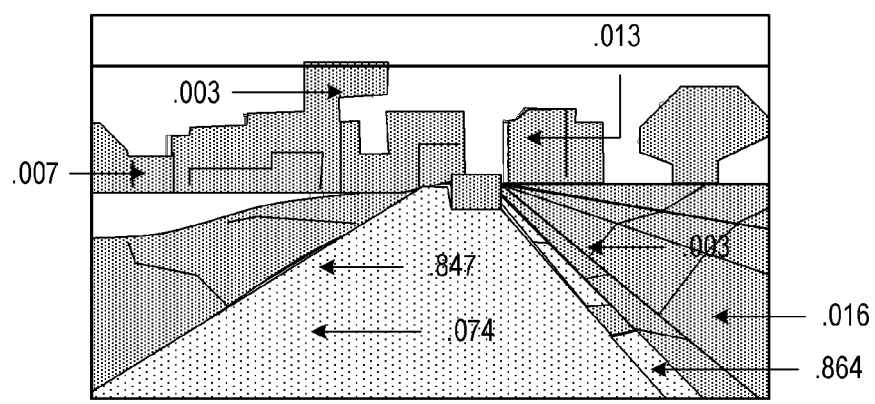
FIG. 7 is a probability decision map of the clear path.

In step 45, a current frame decision map is generated based on the probability updates determined in step 44. The current frame decision map identifies a clear path within the current image. As described earlier, features extracted within the image having higher probabilities values (e.g., greater than 0.5) are associated with the clear path of travel. Those features extracted within the image having lower probability values (e.g., less than 0.5) are associated with the non-clear path of travel. The decision map may fuse one or more of the probability maps of the previous time step frame(s) with the current time step frame for generating the decision map. FIG. 7 illustrates the resulting decision map based on the probability maps shown in FIGS. 2b-5b.

While certain embodiments of the present invention have been described in detail, those familiar with the art to which this invention relates will recognize various alternative designs and embodiments for practicing the invention as defined by the following claims.

What is claimed is:

1. A method of detecting a clear path of travel, the method comprising the steps of:

capturing various input images of a scene exterior of the vehicle utilizing at least one image capture device, the various input images being captured at various time step frames;

generating a clear path probability map of a current time step frame by a processing module, the clear path probability map identifying probability values that represent whether extracted features within the current time step frame are clear path features;

generating a clear path probability map of a temporal previous time step frame by the processing module, the clear path probability map identifying probability values that represent whether extracted features within the previous time step frame are clear path features;

generating a corresponding clear path probability map for the current time step frame, the corresponding clear path probability map derived as a function of the clear path probability map of the previous time step frame and a corresponding mapping that coherently links the previous time step frame to the current time step frame;

generating a weight-matching map by the processing module, the weight-matching map including weight values that identify a degree of successfully matching extracted features between the previous time step frame and the current time step frame;

updating the probability values of the current time step frame as a function of the corresponding probability map, wherein the weight values are applied to the probability values of the corresponding probability map for determining the degree as to which the probability values of the corresponding probability map are used in updating the clear path probability map of a current time step frame;

generating a current frame probability decision map based on updated probability values of the current time step frame; and identifying the clear path in the image of the current time stamp based on the current frame probability decision map.

2. The method of claim 1 wherein the current frame probability map is further determined as a function of a time decay of previous time step frames.

3. The method of claim 1 further comprising the step of identifying a region of interest within the captured image, wherein the region of interest in each captured image is analyzed for generating the clear path probability maps.

4. The method of claim 1 wherein each captured image at each time step frame is segmented into a block-grid, wherein each block within the block-grid in the current time step frame is compared to an associated block in the block-grid of a respective previous time step frame, wherein features are extracted from each of the block-grids for determining whether the extracted features within a respective set of associated blocks match.

5. The method of claim 4 wherein determining whether the extracted features within a respective set of associated blocks match includes comparing features based on appearance feature similarity.

6. The method of claim 5 wherein comparing appearances and determining whether a match is present is performed without occlusions blocking the extracted features.

7. The method of claim 4 wherein weight values are determined based on the degree as to which features of each respective associated set of blocks between the block-grids match, and wherein each respective weight value is assigned to each respective block within the block-grid of the corresponding probability map based on a function of the degree as to which features of the respective associated set of blocks match.

8. The method of claim 7 wherein the weight values are further determined as a function of a time decay factor, wherein increased weighting values are applied to recent time step frames in comparison to less recent time step frames.

9. The method of claim 4 wherein the corresponding mapping that coherently links the previous time step frame to the current time frame is derived as function of the block-grid of the current time step frame and vehicle motion.

10. The method of claim 9 wherein block-grid regions of a respective previous time step frame is determined by propagating the segmented block of the block-grid of the current time step frame to a previous time step frame based on the corresponding mapping.

11. The method of claim 10 wherein an effective block-grid region is generated for each respective previous time step frame, and wherein the effective block-grid region comprises respective blocks within the region of interest of the previous time step frame.

12. The method of claim 11 wherein a block-grid index is assigned to each block within the respective previous time step frame, each assigned block-grid index provides an identifier for matching a respective block of the current time step frame to a respective block of the previous time step frame.

13. The method of claim 1 wherein the current frame probability decision map includes updating probabilities based on a fusing of the current probability clear path map and the corresponding clear path probability map.

14. The method of claim 1 wherein the current frame probability decision map includes updating probabilities based on a fusing of the current probability clear path map and at least two corresponding path probability maps, the at least two corresponding path probability maps being generated at various previous time step frames.

15. The method of claim 1 wherein each probability value within the clear path probability map of the current time step frame is determined based on a formula as follows:

$$p^{TS}(u_0, v_0) = \frac{c_0 \cdot P_0(u_0, v_0) + \sum_{t=1}^{n} c_t \cdot m_t(u_0, v_0 \mid u_t, v_t) \cdot P_t(u_t, v_t)}{c_0 + \sum_{t=1}^{n} c_t \cdot m_t(u_0, v_0 \mid u_t, v_t)}$$

where $p^{TS}(u_0,v_0)$ is a smoothed probability value, $(u_0,v_0)$ is respective block location in the current time step frame, $(u_t,v_t)$ is a respective block location in the previous $t^{th}$ time step frame corresponding to block location $(u_0,v_0)$, $m_t(u_0,v_0|u_t,v_t)$ is a matching function indicating the weight or degree of each block $(u_t,v_t)$ in the previous $t^{th}$ time step frame contributing to a temporal probability update, $c_0$ is a decay factor for a current time step frame, and $c_t$ is a decay factor for a previous time step frame.

16. The method of claim 15 wherein the decay factor includes a value between 0 and 1 and is represented by a following formula:

$$c_t = \lambda^t, t=0,1,\ldots,n, 0<\lambda\leq 1$$

wherein the value of the decay factor relates to a contribution factor of each respective time step frame to have a smoothed probability value $p^{TS}(u_0,v_0)$.

17. The method of claim 16 wherein a decay value equal to 1 indicates an equal contribution is provided from each of the previous time step frames $P_t(u_t,v_t)$.

18. The method of claim 17 wherein a decay value less than 1 indicates a previous time step frame contributes less when from a less recent time period.

19. The method of claim 1 wherein capturing various input images of a scene exterior of the vehicle utilizing at least one image capture device includes utilizing a plurality of image based capture devices, wherein each image based capture device captures a different scene exterior of the vehicle.

* * * * *